(12) United States Patent
Murawski

(10) Patent No.: US 7,305,811 B2
(45) Date of Patent: Dec. 11, 2007

(54) SIDE MOWER DECK FOR A MOWER TRACTOR

(76) Inventor: Eugene Murawski, 2000 Hugenberg La., Fowler, IL (US) 62338

( * ) Notice: Subject to any disclaimer, the term of this patent is extended or adjusted under 35 U.S.C. 154(b) by 0 days.

(21) Appl. No.: 11/608,353

(22) Filed: Dec. 8, 2006

(65) Prior Publication Data

US 2007/0130902 A1 Jun. 14, 2007

Related U.S. Application Data

(60) Provisional application No. 60/748,883, filed on Dec. 9, 2005.

(51) Int. Cl.
*A01D 34/00* (2006.01)
(52) U.S. Cl. ...................................... 56/13.6
(58) Field of Classification Search ................. 56/13.6, 56/385, 11.6, 6, 15.2, 320.1, 17.4; D15/15; 280/32.7
See application file for complete search history.

(56) References Cited

U.S. PATENT DOCUMENTS

| 2,982,080 | A |   | 5/1961  | Martin et al. |       |
|-----------|---|---|---------|---------------|-------|
| 3,080,696 | A | * | 3/1963  | Wood          | 56/13.6 |
| 3,177,638 | A |   | 4/1965  | Johnson       |       |
| 3,255,577 | A |   | 6/1966  | Colburn       |       |
| 3,339,353 | A | * | 9/1967  | Schreyer      | 56/6  |
| 3,418,790 | A |   | 12/1968 | Whitfield et al. |   |
| 3,500,619 | A | * | 3/1970  | Bacon         | 56/6  |
| 3,608,284 | A |   | 9/1971  | Erdman        |       |
| 3,717,981 | A |   | 2/1973  | Van Der Lely  |       |
| 3,757,596 | A | * | 9/1973  | McCanse       | 74/491 |
| 4,189,901 | A | * | 2/1980  | Poettgen      | 56/10.4 |
| 4,308,713 | A | * | 1/1982  | James         | 56/11.9 |
| 4,316,356 | A |   | 2/1982  | Planeta       |       |
| 4,395,865 | A | * | 8/1983  | Davis et al.  | 56/13.3 |
| 4,429,515 | A | * | 2/1984  | Davis et al.  | 56/6  |
| 4,497,160 | A |   | 2/1985  | Mullet et al. |       |
| 4,538,400 | A | * | 9/1985  | Hottes        | 56/11.8 |
| 4,858,417 | A | * | 8/1989  | Priefert et al. | 56/6 |
| 4,869,054 | A |   | 9/1989  | Hostetler et al. |   |
| 4,930,298 | A | * | 6/1990  | Zenner        | 56/17.4 |
| 5,005,344 | A | * | 4/1991  | McCracken     | 56/14.7 |
| 5,161,353 | A |   | 11/1992 | Bergkamp et al. |   |
| 5,203,149 | A | * | 4/1993  | Youngberg et al. | 56/14.9 |
| 5,249,411 | A | * | 10/1993 | Hake          | 56/11.6 |
| 5,483,787 | A | * | 1/1996  | Berrios       | 56/10.1 |

(Continued)

*Primary Examiner*—Arpad F Kovacs
(74) *Attorney, Agent, or Firm*—Polster, Lieder, Woodruff & Lucchesi, L.C.

(57) ABSTRACT

A side-mount mowing attachment for a riding mower or yard tractor is removably secured to the riding mower by single hinge pin, allowing the side-mount mowing attachment to articulate and follow the ground contour independently from the primary mowing deck of the riding mower when in a lowered and operational configuration, and which may to be secured in an upright and vertical position when not in use. Power is provided to the cutting assemblies of the side-mount mowing attachment by a drive-belt and pulley assembly coupled to the primary mowing deck drive mechanism. A winch assembly facilitates lifting of the side-mount mowing attachment to the raised and upright position when not in use. When moved to the raised and upright position, tension is automatically released on the drive-belt in the belt and pulley assembly, thereby stopping the transfer of power from the primary mowing deck drive mechanism to the side-mount mowing attachment cutting assemblies.

14 Claims, 7 Drawing Sheets

U.S. PATENT DOCUMENTS

| | | |
|---|---|---|
| 5,771,669 A | 6/1998 | Langworthy et al. |
| 6,205,754 B1 * | 3/2001 | Laskowski .................. 56/15.1 |
| 6,530,198 B2 * | 3/2003 | Bergsten et al. ............. 56/10.4 |
| 6,546,707 B2 * | 4/2003 | Degelman et al. ........... 56/15.2 |
| 6,647,705 B2 * | 11/2003 | Ewanochko et al. ......... 56/15.2 |
| 6,804,941 B2 * | 10/2004 | Washburn ................... 56/10.4 |

* cited by examiner

SIDE MOWER DECK FOR A MOWER TRACTOR

CROSS-REFERENCE TO RELATED APPLICATIONS

This application claims priority to US Provisional Application No. 60/748,883 filed Dec. 9, 2005, which is entitled "Side Mower Deck for A Mower Tractor" and which is incorporated herein by reference.

STATEMENT REGARDING FEDERALLY SPONSORED RESEARCH

Not Applicable.

BACKGROUND OF THE INVENTION

The present invention is related generally to accessories for small yard tractors such as riding lawn mowers, and in particular, to a detachable and pivoting side-mount mowing deck designed to facilitate the mowing of sloped surfaces adjacent a riding mower.

Small yard tractors and riding mowers typically provide a centrally mounted mowing deck located between the front and rear wheels, with an elevated operator position located above the rear wheels. The mowing deck typically is comprised of two or more rotating cutting blades driven by a drive-belt and pulley assembly coupled to the riding mower engine. As the riding mower is driven over the ground, the blades of the mowing deck cut a swath of grass which is generally slightly wider than the lateral wheel base of the riding mower.

The lateral wheel base of most yard tractors and riding mowers is generally fairly small, and with an operator seated in the elevated operator position, the center of gravity of the yard tractor or riding mower is elevated to a height sufficient to cause operator apprehension when traversing sloped ground. Accordingly, most operators of yard tractors and riding mowers find it difficult to mow laterally along sloped surfaces, such as those found alongside roads, ditches, or hillsides. Some hillsides or embankments can be mowed with a yard tractor or riding mower traveling up or down the slope, however, this is often not possible for smaller ditches or culverts, where the yard tractor or riding mower may become stuck at the bottom of a narrow culvert. Similarly, if a ditch or culvert is narrower than the length of the yard tractor or riding mower, it may not be possible to position the mowing deck sufficiently low within the ditch or culvert to achieve the desired level of grass cutting when traveling across it.

Accordingly, there is a need for an accessory or supplemental side-mount mowing deck which can be easily secured to, and removed from, a yard tractor or riding mower, and which can be raised or lowered as required to follow the contour of the ground adjacent to the path of the yard tractor or riding mower, independent of the position of the primary mowing deck.

BRIEF SUMMARY OF THE INVENTION

Briefly stated, a side-mount mowing attachment for a riding mower or yard tractor is mechanically secured to the riding mower by a hinge pin, allowing the side-mount mowing attachment to articulate and follow the ground contour independently from the primary mowing deck of the riding mower when in a lowered and operational configuration, and which may be secured in an upright and vertical position when not in use. Power is provided to the cutting assemblies of the side-mount mowing attachment by a drive-belt and pulley assembly coupled to the primary mowing deck drive mechanism. A powered winch assembly secured to the riding mower chassis facilitates lifting of the side-mount mowing attachment to the raised and upright position when not in use. When in the raised and upright position, tension is released on the drive-belt of the belt and pulley assembly, thereby preventing the transfer of power from the primary mowing deck drive mechanism to the side-mount mowing attachment cutting assemblies. An optional cover is provided for securing over the cutting assemblies when the side-mount mowing attachment is in the raised and upright position.

In an embodiment of the side-mount mowing attachment of the present invention, the cutting assemblies are configured with at least one rigid cutting blade.

In an embodiment of the side-mount mowing attachment of the present invention, the cutting assemblies are configured with at least one flexible cutting line.

In an embodiment of the side-mount mowing attachment of the present invention, the procedure for removal of the side-mount mowing attachment from the riding mower simply requires removal of a hinge pin, disconnection of a lifting cable, and disconnection of a drive-belt.

The foregoing features of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

DESCRIPTION OF THE PREFERRED EMBODIMENT

The following detailed description illustrates the invention by way of example and not by way of limitation. The description enables one skilled in the art to make and use the invention, and describes several embodiments, adaptations, variations, alternatives, and uses of the invention, including what is presently believed to be the best mode of carrying out the invention.

Figure 1:
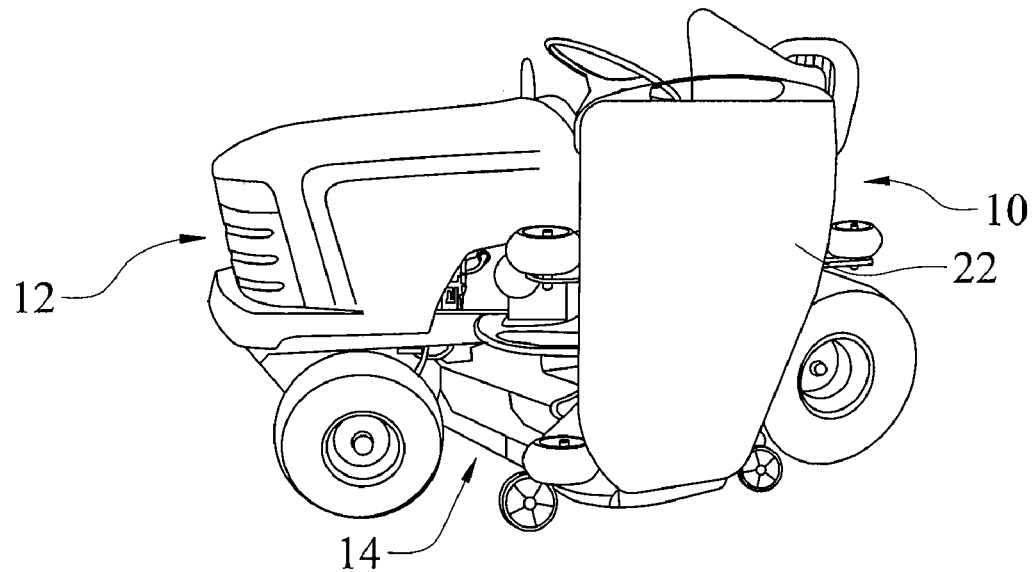
FIG. 1 is a perspective view of the side-mount mowing deck of the present invention secured to a riding mower, in a raised and covered configuration.
Figure 2:
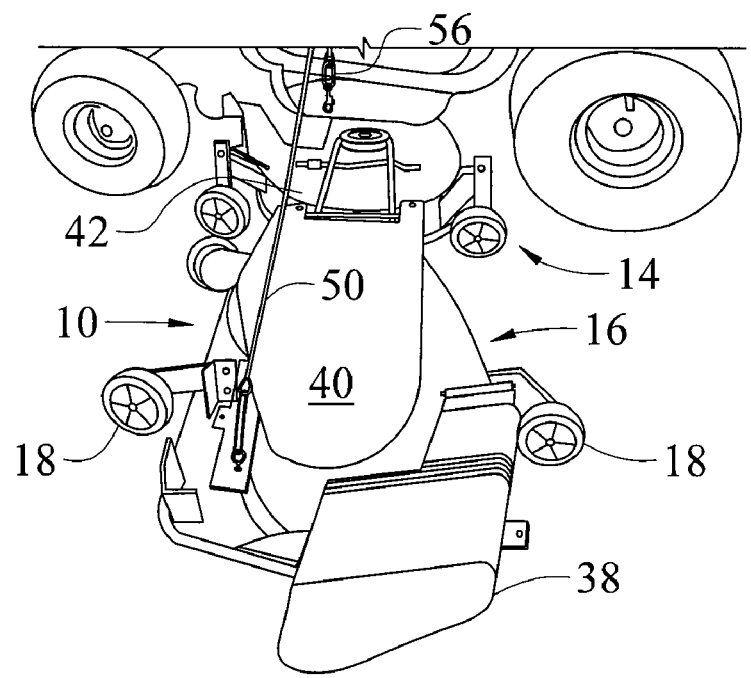
FIG. 2 is a perspective view of the side-mount mowing deck of the present invention secured to a riding mower, in a lowered and operational configuration.

With reference to FIGS. 1 and 2, an articulating side-mount mowing attachment 10 for a riding mower or yard tractor 12 is shown generally in both the raised upright travel or storage position and the lowered operational position. The side-mount mowing attachment 10 is mechanically secured adjacent to the primary mowing deck 14 of the riding mower by a removable single-pin hinge coupling 52, allowing the side-mount mowing attachment 10 to articulate and follow the contour of the ground independently from the primary mowing deck 14 of the riding mower 12 when in the lowered and operational position. The independent articulation enables the riding mower or yard tractor 12 to be driven on level surfaces parallel to a culvert or embankment while the side-mount mowing attachment 10 is lowered into the culvert or onto the embankment for mowing operations, thereby facilitating the mowing thereof while decreasing the risk of overturning the riding mower or yard tractor 12.

Figure 3:
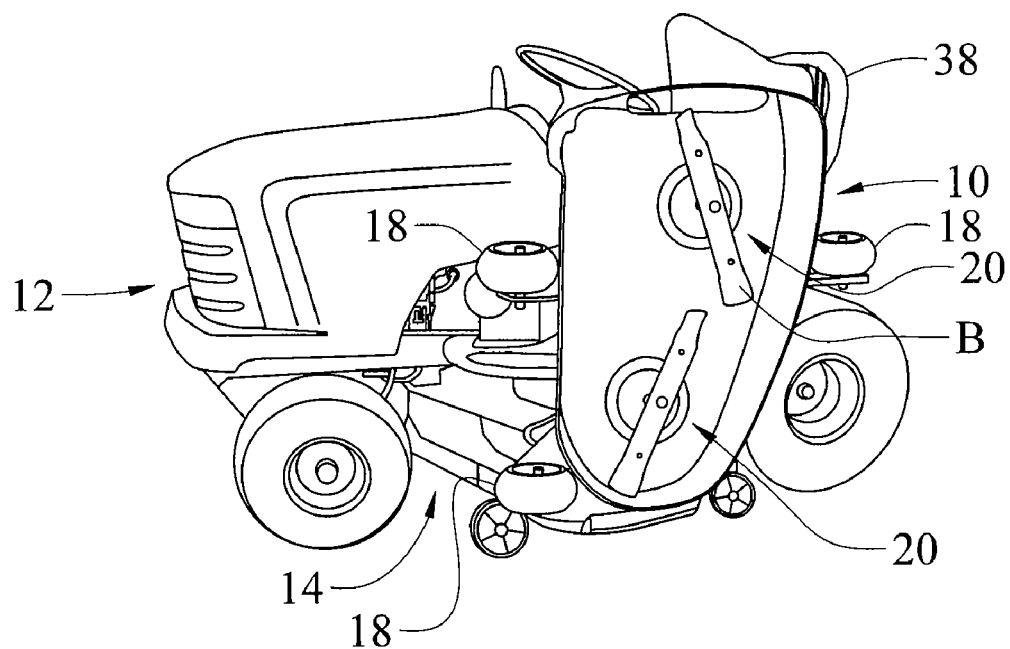
FIG. 3 is a perspective view of the side-mount mowing deck of the present invention secured to a riding mower, in a raised configuration with rigid cutting blades.
Figure 4:
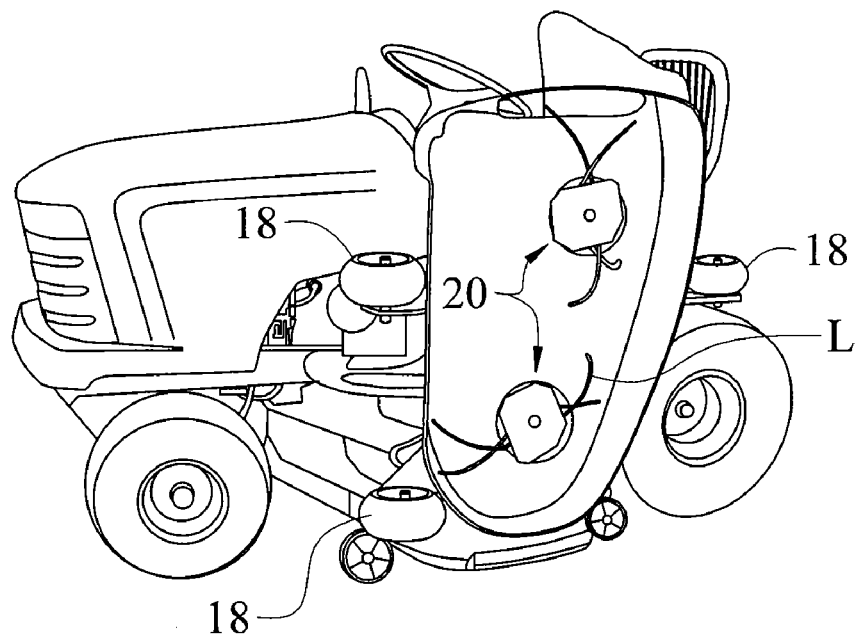
FIG. 4 is a perspective view of the side-mount mowing deck of the present invention secured to a riding mower, in an alternate raised configuration with flexible cutting lines.

In general, the side-mount mowing attachment 10 comprises an elevated mowing deck 16 having a plurality of supporting wheels 18, one or more cutting assemblies 20 disposed below, and supported by, the mowing deck 16. As is seen in FIGS. 3 and 4, the cutting assemblies 20 may include any of a variety of cutting mechanisms, such as the rigid cutting blades B shown in FIG. 3, flexible cutting lines L such as shown in FIG. 4, or other commonly utilized driven cutting mechanisms. When not in use, the cutting assemblies 20 may optionally be shielded by a lower cover 22 secured to the elevating mowing deck 16, as shown in FIG. 1.

A drive-belt and pulley power transfer system 30 for driving the cutting assemblies 20 is located above, and supported by, the elevated mowing deck 16. Each of the rotating cutting assemblies 20 is mechanically coupled to a pulley 32 in the power transfer system 30 by a rotating shafts (not shown) passing through the elevated mowing deck 16. Power to drive the cutting assemblies 20 is delivered to the pulleys 32 by a serpentine drive-belt 34 coupled to a powered drive pulley 36 associated with the primary mowing deck 14 of the riding mower or yard tractor 12. The path of the drive-belt 34 is configured such that the two cutting members (i.e., the two blades or strings as seen in FIGS. 3 and 4) rotate in the same direction. Rotation of the cutting assemblies 20 of the side-mount mowing attachment 10 in the same direction better directs the cut grass to the side deck chute 38, so that the grass cut by both the cutting assemblies 20 of the side mowing deck 16 will exit the side deck 16 through the chute 38. However, those of ordinary skill will recognize that alternate configurations of the drive-belt path are possible, and may be varied to achieve different rotational directions for different cutting members, such as to accommodate a rear deck chute in place of a side deck chute, or individual chutes for each of the cutting assemblies. With each configuration, the cutting assemblies 20 of the side-mount mowing attachment 10 are only operated when the powered drive pulley 36 of the primary mowing deck 14 is operated, and hence, only when the cutting assemblies of the primary mowing deck 14 are engaged. A shield 40 is preferably disposed over the drive-belt and pulley power transfer system 30, such as shown in FIG. 2.

Figure 5:
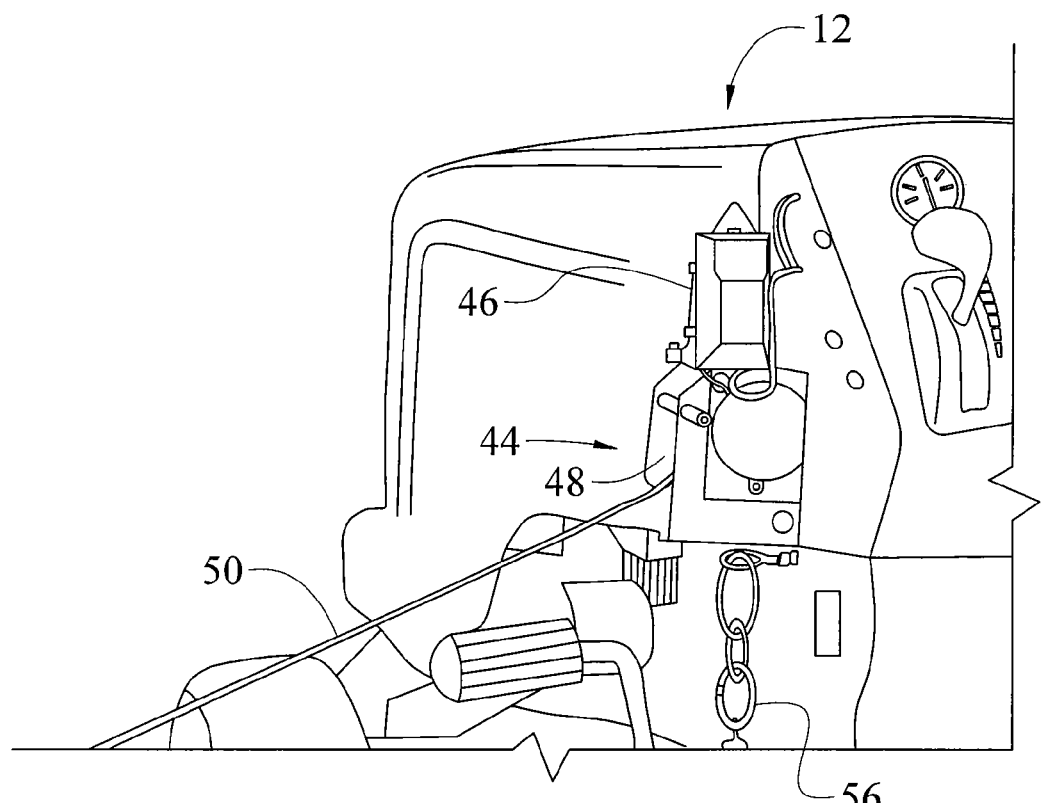
FIG. 5 is a perspective view of a winch assembly for raising and lowering the side-mount mowing deck of the present invention.
Figure 6:
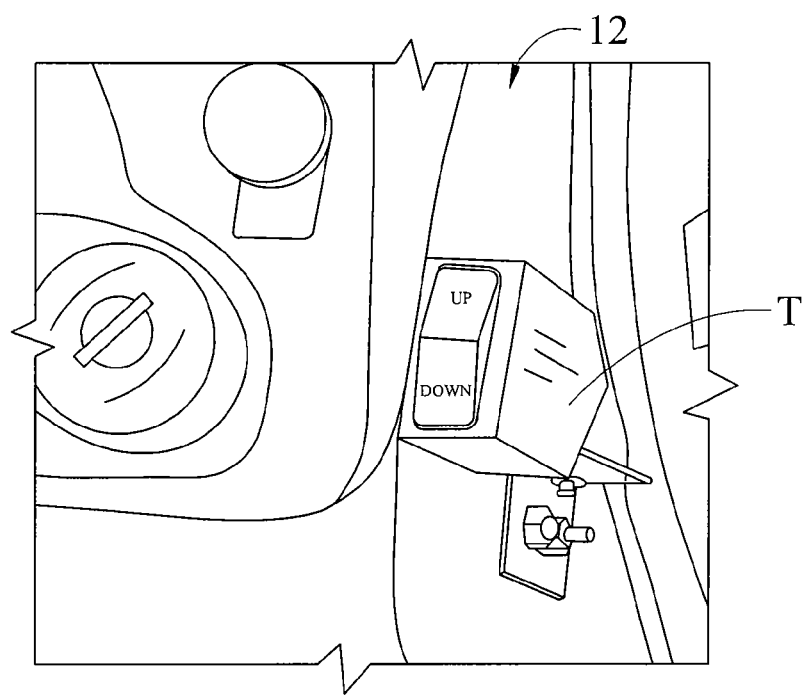
FIG. 6 is a perspective view of a switch assembly for controlling operation of the winch assembly of FIG. 5.
Figure 7:
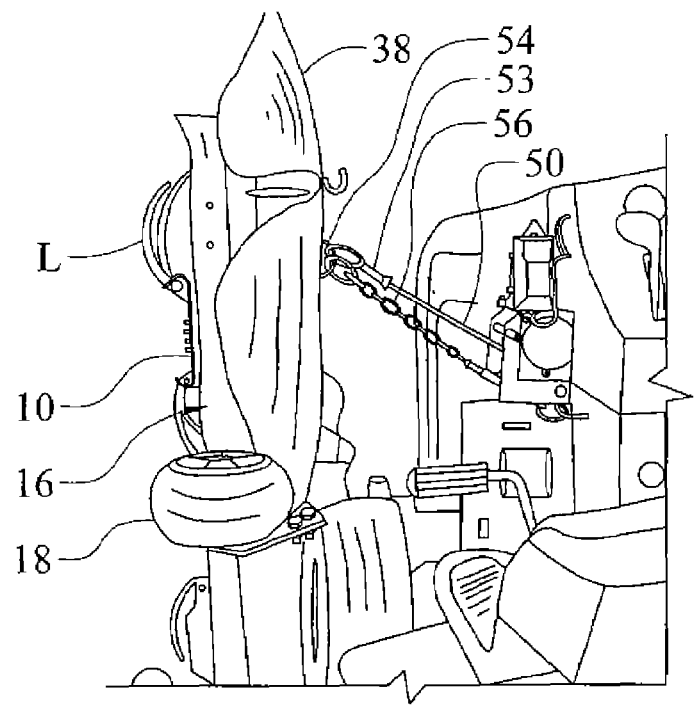
FIG. 7 is a perspective view of the side-mount mowing deck of the present invention secured to a riding mower, in a raised configuration and secured with a safety chain.

To articulate the side-mount mowing attachment 10 about the coupling 52 provided by the hinge pin 42, between the raised upright travel or storage position and the lowered operational position, a powered winch assembly 44 is preferably utilized, as shown in FIG. 5. The winch assembly 44 includes a winch motor 46 and winding drum 48 contained within a housing, and a winch cable 50 secured at one end to the winding drum. The opposite end of the winch cable is removably secured to the elevated mowing deck 16 of the side-mount mowing attachment 10 outwardly from the hinge coupling 52. The winch cable 50 can be removably connected to the mowing deck 16 in any desirable fashion. For example, a clip 53 can be used which connects to an attachment member 54 on the mowing deck 16. Actuation of the winch assembly 44, such as by means of a toggle switch T as shown in FIG. 6, winds or unwinds the winch cable to articulate the side-mount mowing attachment 10 about the hinge coupling 52. When in the raised position, a length of safety chain 56 may optionally be secured between an attachment point on the elevated mowing deck 16 of the side-mount mowing attachment 10 and the chassis of the riding mower or yard tractor 12, as shown in FIG. 7. Those of ordinary skill in the art will recognize that a wide variety of winch assemblies may be used. For example, the winch assembly need not be powered, but can be a manual crank-operated winch assembly. Additionally, the same pivoting movement of the side-mount mowing attachment may be achieved manually by means of a rope which is secured at one end to the elevated mowing deck 16 of the side-mount mowing attachment 10 and at another end to the riding mower or yard tractor 12.

Figure 8:
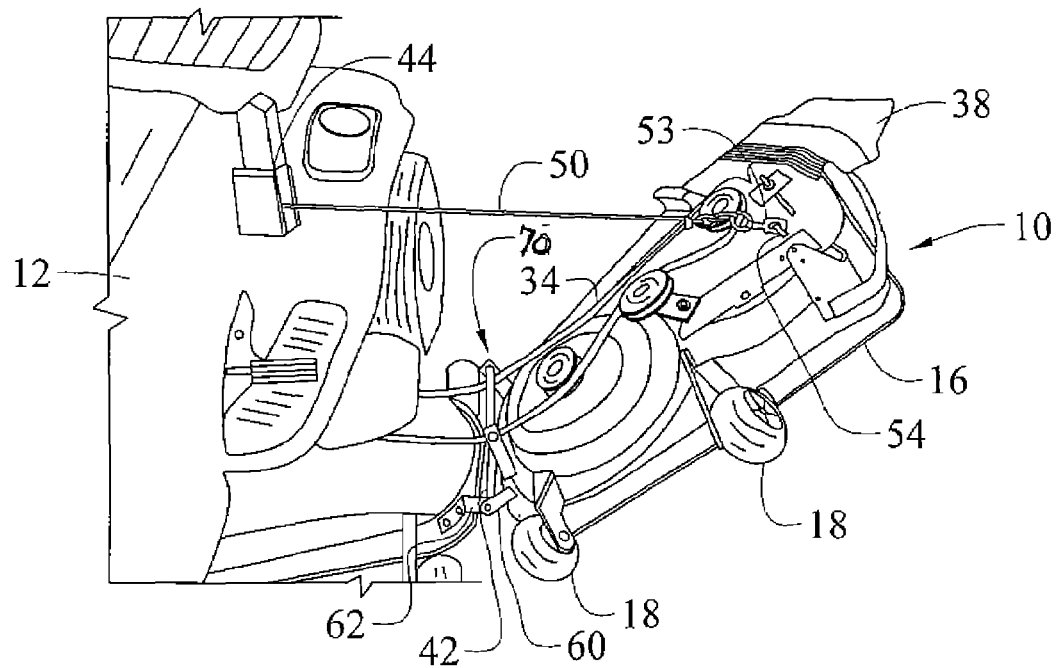
FIG. 8 is a perspective view of the side-mount mowing deck of the present invention in a partially-raised configuration, with the cover removed to illustrate drive-belt tension release.
Figure 9:
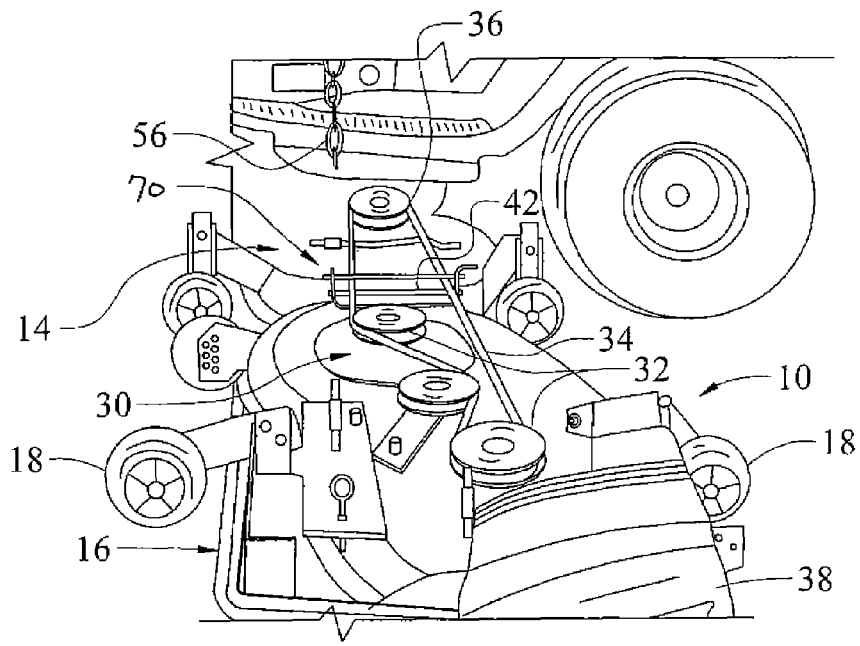
FIG. 9 is a perspective view of the side-mount mowing deck of the present invention in a lowered and operational configuration, with the cover removed to illustrate drive-belt engagement.
Figure 10:
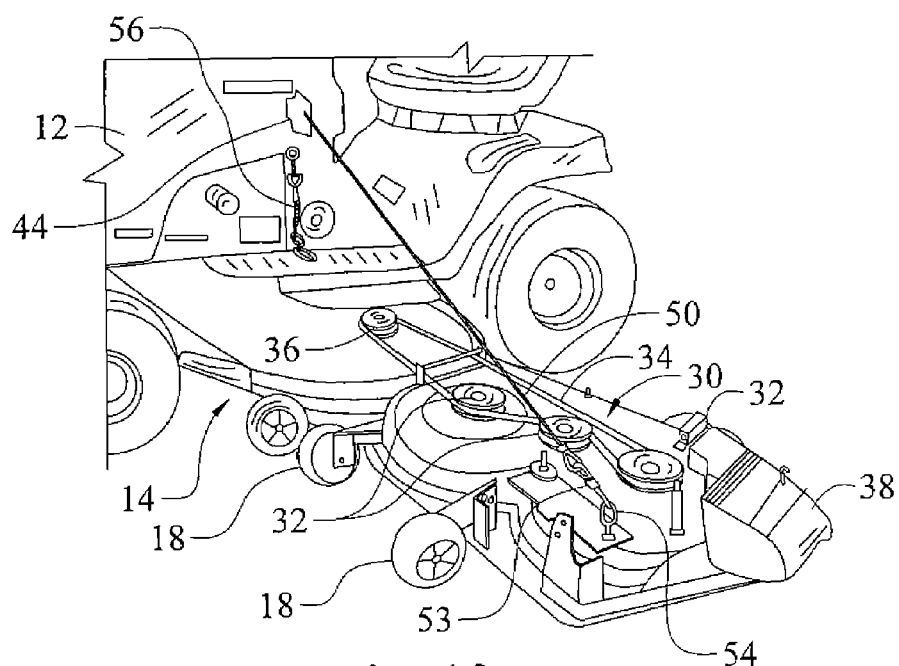
FIG. 10 is a second perspective view of the side-mount mowing deck of the present invention in a lowered and operational configuration, with the cover removed to illustrate drive-belt engagement.

As an added safety feature, when the side-mount mowing attachment 10 is in the raised and upright position, the change in angular relationship between the side-mount mowing attachment 10 and the primary mowing deck 14 of the riding mower or yard tractor 12 releases the tension on the serpentine drive-belt 34 in the belt and pulley power transfer system 30 as shown in FIG. 8, thereby preventing the transfer of power from the primary mowing deck drive pulley 36 to the side-mount mowing attachment cutting assemblies 20. When the side-mount mowing attachment 10 is lowered to the near horizontal position, such as shown in FIGS. 9 and 10, the serpentine drive-belt 34 is tensioned, and engages the various drive pulleys 32, enabling operation of the cutting assemblies 20. Thus, the side-mount mowing attachment 10 can be raised into a non-operating position or lowered into an operating position when the powered pulley 36 of the primary mower deck 14. If the side-mount mowing attachment 10 is raised while the powered pulley 36 of the primary mower deck 14 is in operation (i.e., being rotated), the cutting assemblies 20 will cease rotation when the tension of the drive belt 34 is relaxed during raising of the side-mount mowing attachment. Hence, the cutting assemblies 20 cannot rotate when the side-mount mowing attachment is in its raised position.

Those of ordinary skill will recognize that the tension on the serpentine drive belt 34, and therefore the power transferred (and amount of slip) is related to the angular relationship between about the hinge coupling 52 between the side-mount mowing attachment 10 and the primary mowing deck 14. Preferably, the serpentine drive belt 34 maintains sufficient tension to drive the cutting assemblies 20 over a sufficient range of articulation of the side-mount mowing attachment 10 to enable the side-mount mowing attachment 10 to mow surfaces which are sloped upward and downward relative to the orientation of the primary mowing deck 14.

Figure 11:
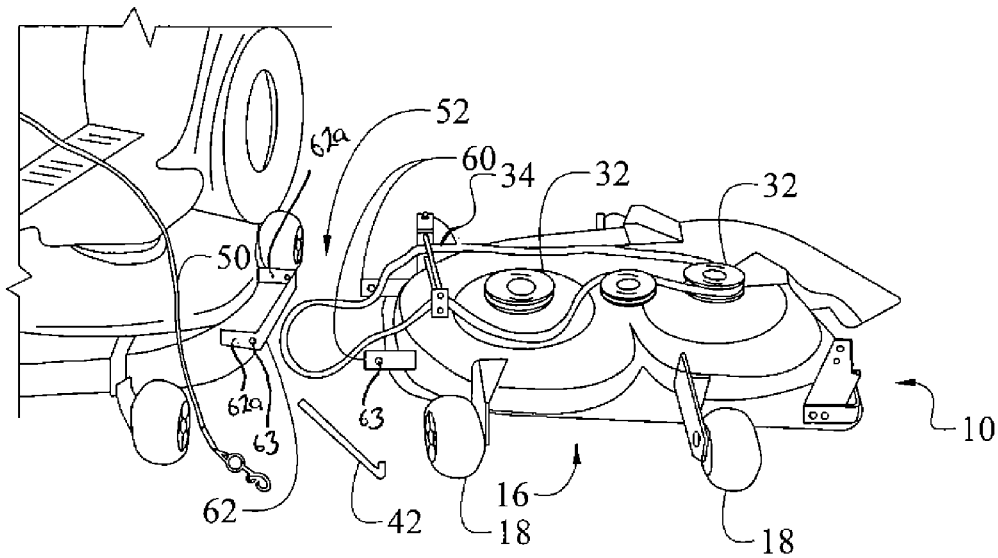
FIG. 11 is a perspective view of the side-mount mowing deck of the present invention disassembled from the riding mower by removal of the connecting pin, lifting cable, and drive-belt.
Figure 12:
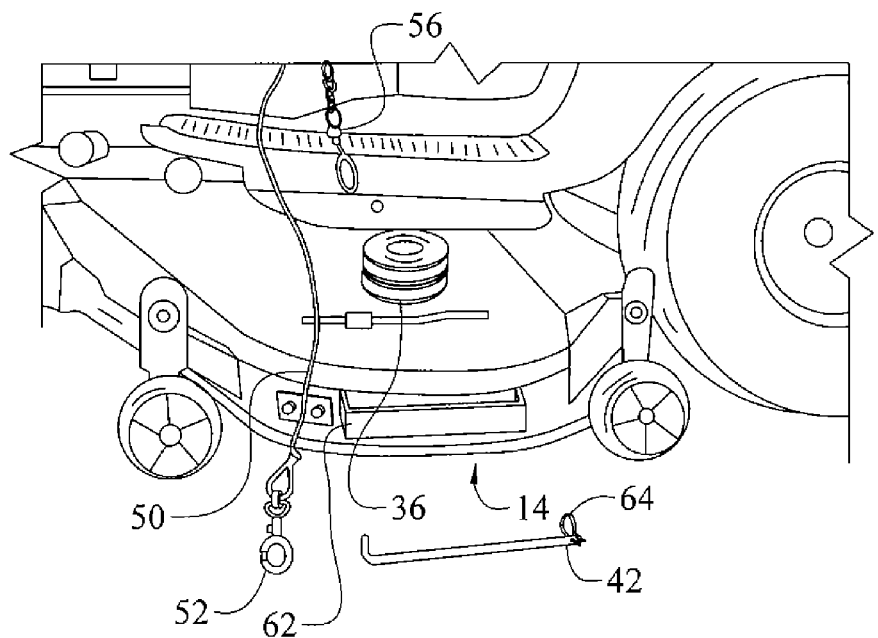
FIG. 12 is a perspective view of the attachment points on a riding mower for the side-mount mowing deck of the present invention.

Turning to FIGS. 11 and 12, removal and installation of the side-mount mowing attachment 10 is illustrated. The primary attachment between the side-mount mowing attachment and the primary mowing deck consist of the hinge coupling 52. The hinge coupling 52 includes the single hinge pin 42 which passes through a pair of spaced-apart hinge supports 60 on the elevated mowing deck 16 and an aligned pair of spaced-apart hinge supports 62 on the primary mowing deck 14. As seen, the hinge support 60 comprises a pair of spaced apart arms which extend from an inner side of the attachment mowing deck 16 and the hinge support 62 comprises a pair of spaced apart arms mounted to and extending from the primary mowing deck 14. The arms 60 and 62a of the hinge supports each have a hole 63. As seen in FIG. 8. the holes 63 of the hinge support arms 60 being aligned with the holes 63 of the hinge support arms 62a. Preferably, the single hinge pin 42 is curved or bent at one end (as seen in FIG. 12) to limit the movement of the hinge 42 pin through the hinge supports 60 and 62, and includes a diametrical bore adjacent an opposite end to receive a cotter pin or locking pin 64. The pin 42 extends through the holes 63 in the hinge support arms to hingedly connect the side mount mowing 16 attachment to the tractor main deck 14. Secondary connections between the side-mount mowing attachment and the primary mowing deck include the releasable winch cable 50 and the serpentine drive belt 34.

To disconnect the side-mount mowing attachment from the primary mowing deck, the serpentine drive belt 34 is disconnected from the drive pulley 36 of the primary mower deck 14 when under low tension. Next, the side-mount mowing attachment 10 is articulated about the hinge coupling 52 to a lowered position on a supporting surface. The cotter pin or locking pin 64 is removed from the end of the hinge pin 42, and the hinge pin 42 is withdrawn from the hinge supports 60 and 62. Finally, the winch cable 50 is released from the attachment point 54 on the elevated mowing deck 16, and the side-mount mowing attachment 10 is separated from the riding mower or yard tractor 12. The process is reversed for attachment of the side-mount mowing attachment 10 to the primary mowing deck 14.

Lastly, the mowing attachment includes a keeper or guide 70 positioned at an inner edge of the attachment mower deck 16 (i.e. the side of the mower deck 16 adjacent the tractor main deck 14 when connected to the tractor main deck). The keeper 70 includes a pair of spaced apart legs 72 extending upwardly from the upper surface of the mower deck 16. An upper bar 74 and a lower bar 76 extend between the keeper legs 72. As seen, for example. in FIG. 13, when the mowing attachment 10 is connected to the tractor 12, the drive belt 34 extends through the keeper between the legs 72 and between the bars 74, 76.

Figure 13:
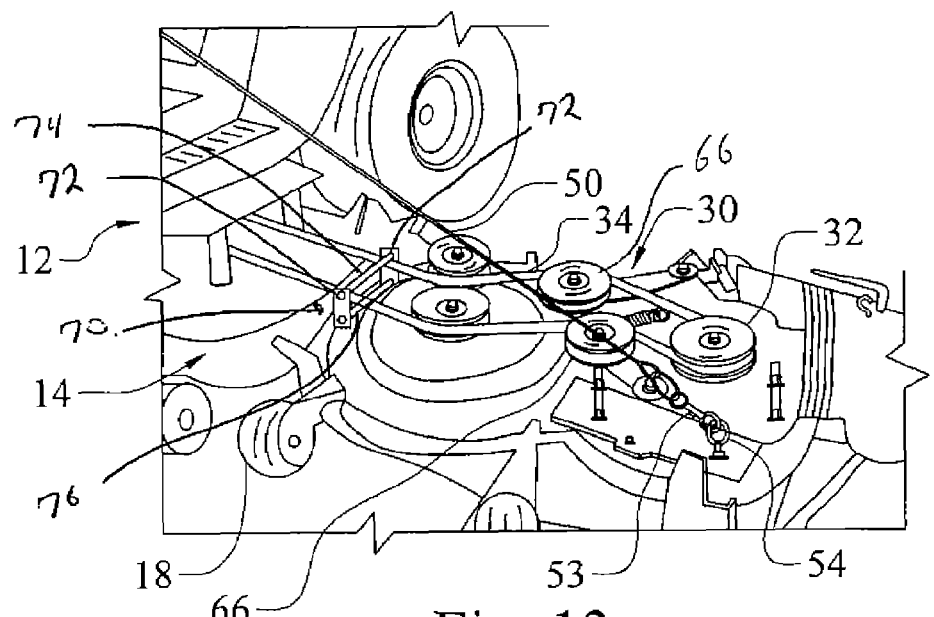
FIG. 13 is a perspective view of an alternate embodiment of the side-mount mowing deck of the present invention configured with spring-tensioned pulleys in the belt-and-pulley drive system.
Figure 14:
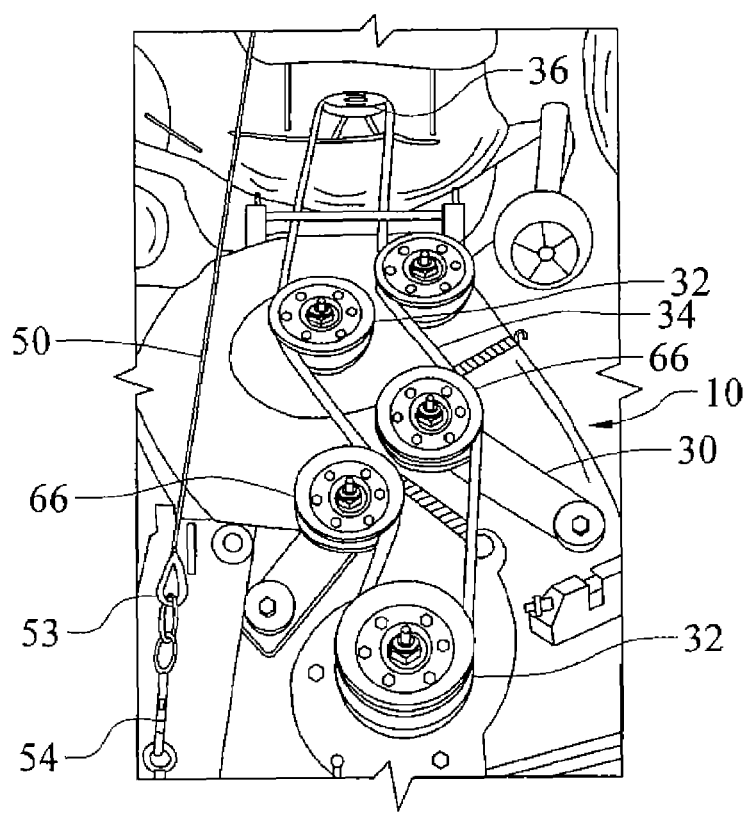
FIG. 14 is a perspective view illustrating the embodiment of FIG. 13 from a different angle.

As previously stated, the path of the drive belt 34 through the pulley system of the mower deck 16 may be adapted to a variety of configurations. For example, as shown in FIGS. 13 and 14, additional spring-tensioned pulleys 66 may be added to the drive belt path to maintain a desired level of tension in the drive belt 34 during mowing operations. As also seen, the embodiment shown in FIGS. 13 and 14 has a second center pulley (for a total of four pulleys). I have found that the addition of this fourth pulley enables the side mowing deck to run more smoothly.

The side mowing deck of the present invention has many advantages over currently available side mowers or pull-behind mowers.

The mower deck is driven by the tractor's engine, and hence, does not need its own separate source of power.

The mower deck is fairly simple in design, and thus is easy to repair, should repairs ever be necessary.

The side mower deck is fairly thin, and, when removed from the tractor, can be stored in an upright position or even hung on a wall. Hence, the mower deck will not take up significant amount of storage space.

The use of the single hinge pin to connect the side mower deck to the tractor deck enables the side mower deck to be connected to, and removed from, the tractor with relative ease. Because the side mower deck can be easily connected to, and removed from, the tractor, it can be detached and stored when not in use, and then can be used only when needed.

The side mower deck is easier to operate and control than a pull-behind or trail mower.

The relative small height of the side mower deck allows for the side deck to reach under small areas, such as shrubs, etc.

As various changes could be made in the above constructions without departing from the scope of the invention, it is intended that all matter contained in the above description or shown in the accompanying drawings shall be interpreted as illustrative and not in a limiting sense. For example, the hinge mechanism could be changed, such that there are two pins, rather than a single pin. The securement of the pivot hinge could be altered. For example, the pin could be threaded at one (or both) ends to receive a nut. The power transfer system 30 could be a gear driven system, rather than a drive belt system. However, in this instance, a drive belt would still be used to transfer power from the powered pulley 36 of the primary mowing deck 14 to such gears, and the driven gears would then drive the cutting assemblies. Although the winch assembly 44 is shown in the drawings to be mounted to the riding mower or lawn tractor 12, the winch assembly 44 could, instead, be mounted to the upper surface of the raised mowing deck 16 of the side-mount mowing attachment 10. In this instance, the cable 50 would be connectable to an attachment point on the riding mower or lawn tractor 12. This would eliminate the need to mount a winch assembly to the riding mower or lawn tractor 12, making initial installation of the side-mount mowing attachment 10 simpler. However, if a powered winch assembly is used, it would also require an electrical connection to the riding mower or lawn tractor 12 be made upon attachment of the side-mount mowing attachment 10 to the riding mower or lawn tractor 12, or that the side-mount mowing attachment 10 be provided with a power source (such as a battery) which could power the powered winch assembly. These examples are merely illustrative.

The invention claimed is:

1. A side-mount mowing attachment for a riding mower or yard tractor, comprising:

a mowing deck having at least one cutting assembly; said mowing deck having a front side, a back side, an inner side, and an outer side; said mowing deck being adapted to be removably secured to a primary mowing deck of the riding mower or yard tractor by a hinge coupling at said mower inner side, said hinge coupling configured to allow said mowing deck to articulate independently from said primary mowing deck;

a quick release enabling said attachment to be quickly removed from, and attached to, the primary mowing deck of said tractor; said quick release comprising said hinge coupling; said hinge coupling comprising a first hinge support comprising a pair of spaced apart arms mounted to and extending from said primary mowing deck of said tractor, a second hinge support comprising a pair of spaced apart arms mounted to and extending from said attachment mowing deck inner side, and a hinge pin; said arms of said first and second hinge supports each comprising a holes; the holes of said second hinge support being aligned the holes of said first hinge support; said hinge pin extending through the aligned holes of said first and second hinge supports to pivotally connect said second hinge support to said first hinge support; said hinge pin being received in said hinge supports for easy removal of said pin from said hinge supports;

a cable operatively coupled to said mowing deck outwardly from said hinge coupling; said cable being movable between a retracted and an extended position to selectively pivot said mowing deck between a raised position and a lowered position;

a power transfer system operatively coupled to said at least one cutting assembly; said power transfer system being adapted to be engagable with said primary mowing deck of said riding mower or yard tractor, said power transfer system configured to drive said at least one cutting assembly only when said mowing deck is in said lowered position; said power transfer system comprising a drive-belt and at least one pulley; said at least one cutting assembly being operatively connected to said at least one pulley; said drive-belt being sized to engage a drive pulley of said tractor; and a keeper extending upwardly from said attachment mower deck near said mower deck inner side; said keeper comprising a pair of legs extending upwardly from said mower deck and an upper bar extending between said legs; said upper bar extending generally parallel to said hinge pin when said hinge pin is received in said hinge supports; said drive belt extending between said keeper arms and below said keeper upper bar when said attachment is connected to the tractor.

2. The side-mount mowing attachment of claim 1 including a winch assembly, said winch assembly being operable to move said cable between its said retracted position and said extended position to pivot said mowing deck about said hinge coupling between said raised position and said lowered position.

3. The side-mount mowing attachment of claim 1 wherein said power transfer system is configured to automatically release tension on said drive-belt when said mowing deck is moved to said raised position from said lowered position, thereby uncoupling said at least one cutting assembly from a source of driving power.

4. The side-mount mowing attachment of claim 1 further including a shield disposed over a portion of said drive-belt and pulley power of said transfer system.

5. The side-mount mowing attachment of claim 1 further including a lower cover removably disposed over an exposed portion of said at least one cutting assembly when said mowing deck is in said raised position.

6. The side-mount mowing attachment of claim 1 further including a safety chain configured to secure said mowing deck to said riding mower chassis in said raised position.

7. The side-mount mowing attachment of claim 2 wherein said winch assembly includes an actuating switch.

8. The side-mount mowing attachment of claim 1 wherein said cable is releasably coupled to said mowing deck.

9. The side-mount mowing attachment of claim 1 wherein said at least one cutting assembly includes a rigid cutting blade.

10. The side-mount mowing attachment of claim 1 wherein said at least one cutting assembly includes a flexible cutting line.

11. The side-mount mowing attachment of claim 1 wherein said hinge coupling is further configured to enable said mowing deck to articulate at an angle relative to said primary mowing deck during operation.

12. The side-mount mowing attachment of claim 1 wherein said at least one pulley of said power transfer system includes at least one spring-tensioned pulley.

13. The side mount mowing attachment of claim 1 wherein said quick release further includes a lock member removably received in said hinge pin; said lock member being configured to prevent said pin from being withdrawn from said first and second hinge supports.

14. The side mount mowing attachment of claim 1 wherein said keeper further includes a lower bar positioned beneath said upper bar; said belt extending over said keeper upper bar.

* * * * *